United States Patent [19]
Comp et al.

[11] Patent Number: 5,875,350
[45] Date of Patent: Feb. 23, 1999

[54] COMPRESSED MESSAGE EXCHANGE INITIATED BY BASIC COMMAND ACCOMPANIED BY ENHANCEMENT CODE

[75] Inventors: Charles McLees Comp; Gregory Albert Dancker, both of Rochester, Minn.; William Van Durrett, Harrisburg, N.C.; Harvey Gene Kiel, Rochester, Minn.; William Wyche Plyler, Charlotte, N.C.; John Elliott Walker, York, S.C.

[73] Assignee: International Business Machines Corporation, Armonk, N.Y.

[21] Appl. No.: 843,764

[22] Filed: Apr. 21, 1997

[51] Int. Cl.$^6$ ............................................. G06F 13/14
[52] U.S. Cl. .................... 395/831; 395/882; 395/892; 395/285; 395/200.67; 395/200.76; 395/306; 395/309
[58] Field of Search ..................... 395/831, 882, 395/892, 200.67, 200.76, 306–309; 345/507

[56] References Cited

U.S. PATENT DOCUMENTS

| 4,562,533 | 12/1985 | Hodel et al. | 395/200.67 |
| 4,787,027 | 11/1988 | Prugh et al. | 395/885 |
| 5,457,784 | 10/1995 | Wells et al. | 395/829 |
| 5,774,683 | 6/1998 | Gulick | 395/309 |
| 5,777,630 | 7/1998 | Aaker et al. | 345/507 |
| 5,793,993 | 8/1998 | Broedner et al. | 395/306 |

OTHER PUBLICATIONS

C.M. Comp et al., "Optimized Bit Stream for IBM 5250 Protocol", *IBM Technical Disclosure Bulletin*, vol. 33, No. 8, Jan. 1991, pp. 99–102.

Primary Examiner—Christopher B. Shin
Attorney, Agent, or Firm—Dan Hubert; Terrance A. Meador

[57] ABSTRACT

A controller and a properly equipped peripheral device of a computer system easily exchange messages having a compressed data format. Both the controller and the peripheral device are configured to communicate using a predefined basic command set employing a predefined communications format. The controller first verifies that the peripheral device supports a second predefined communications format in addition to the first predefined communications format. Compared to the first format, the second format utilizes messages with greater compression, i.e., an optimized bit stream ("OBS"). The controller next sends the peripheral device a number of commands, including a command of the basic command set accompanied by an OBS enable code. In the case of a write operation, the controller also sends the peripheral device an encoded dataset having the second predefined communications format and representing an underlying unencoded dataset. Although the basic command alone would alert the peripheral device to the transmission of uncompressed data, the presence of the OBS enable code signals a compressed dataset. The peripheral device receives the encoded dataset and, resulting from the received OBS enable code and the command of the basic command set, processes the encoded dataset to obtain the unencoded dataset. In the case of a read operation, the controller receives an encoded dataset, in the second predefined format, from the peripheral device.

22 Claims, 8 Drawing Sheets

*(PRIOR ART)*

COMPRESSED MESSAGE EXCHANGE INITIATED BY BASIC COMMAND ACCOMPANIED BY ENHANCEMENT CODE

BACKGROUND OF THE INVENTION

1. Field of the Invention

The present invention relates to computer systems with peripheral devices such as printers and video displays. More particularly, the invention concerns an apparatus, article of manufacture, or method in which a controller initiates exchange of a message having a compressed format by transmitting an OBS enable code along with a basic command. Transmitting the basic command without the OBS enable code, however, initiates the exchange of messages having a predefined uncompressed format.

2. Description the Related Art

Many modern computer systems include a central processing unit ("CPU") with a number of peripheral devices. This is often a cost effective approach, because multiple peripheral devices can share one expensive, powerful CPU. Another advantage of these systems is that peripheral devices may be remotely located from the CPU. The peripheral devices are typically coupled to a communications port of the CPU by connecting cable, which may be tens, hundreds, or even thousands of feet long.

Each of the CPU's ports may be used by one peripheral device alone, or shared by multiple devices. With a "point-to-point" arrangement, a port is used by one device. With a "cable-thru" configuration (also called "multi-drop"), a port may be shared by multiple devices; the port is coupled to one peripheral device, which is connected to one or more other devices in daisy chain fashion. An exemplary protocol for communications between a CPU and distributed peripheral devices is the IBM 5250 Twinaxial protocol (called "Twinax").

Figure 1:
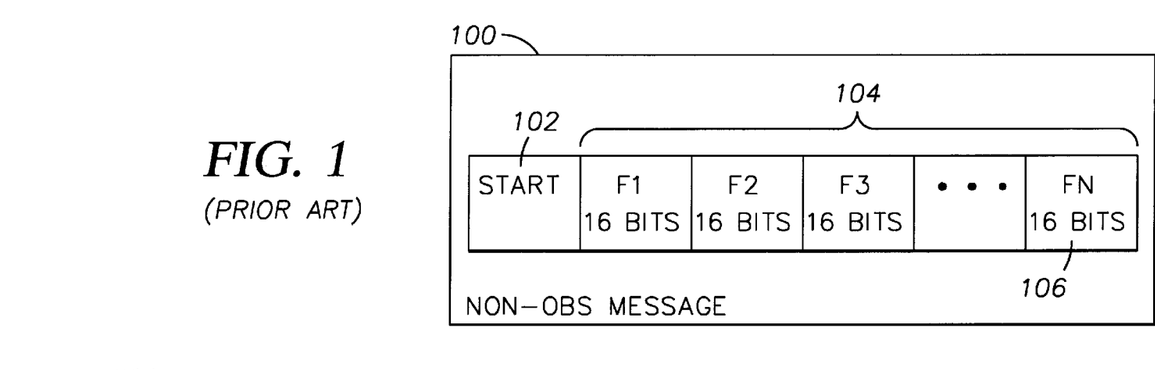
FIG. 1 is a diagram of a non-OBS message, as known in the art.

FIG. 1 depicts one example of the format used in a conventional Twinax message. The message 100 begins with a start code 102, continuing with one or more sixteen bit data or command frames 104. The start code 102 is a unique binary pattern that signals the beginning of the message 100. Successive frames are shown by F1, F2, F3, and so on. The last frame 106 may contain an error checking code, a stop code, etc.

Figure 2:
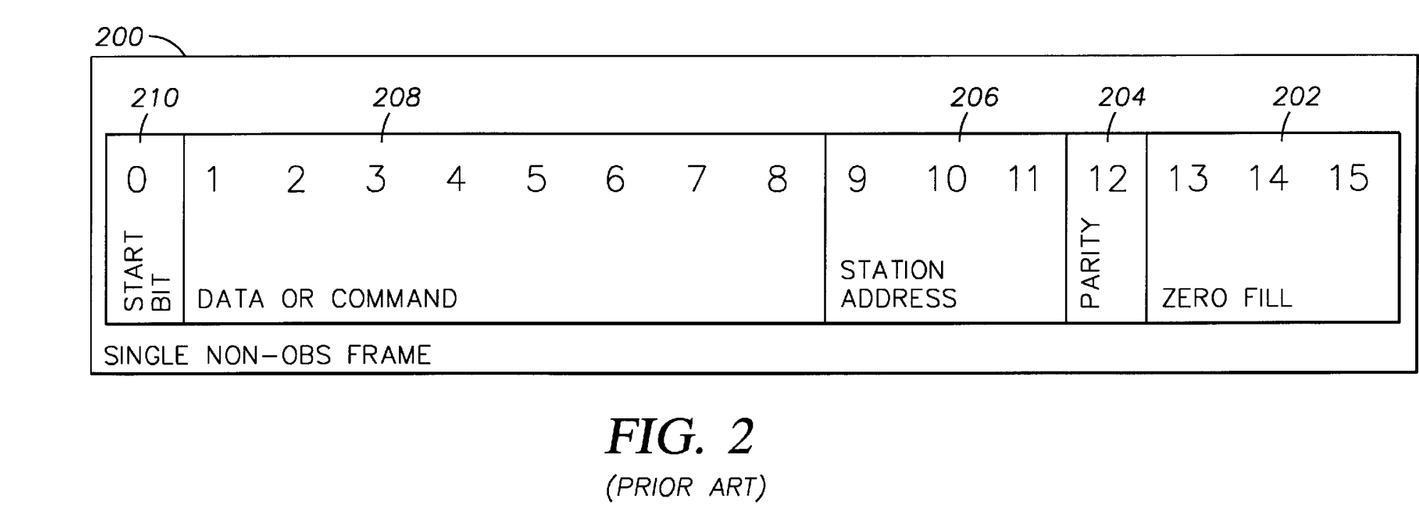
FIG. 2 is a diagram of a single non-OBS frame, as known in the art.

FIG. 2 illustrates an individual sixteen-bit frame of the message 100. The frame 200 includes a one-bit start bit 210, an eight-bit data/command field 208, a three-bit station address 206, a one-bit parity field 204, and three-bit zero-fill field 202. The zero fill field 202 is typically unused, being filled with three zeros. The parity field 204 is filled with an appropriate bit that, when considered with the contents of the data/command field 208, yields a predetermined parity, such as even parity. The station address 206 identifies the one peripheral device that the frame 200 is directed to, since other peripheral devices may also be attached to the CPU port and thus receive the frame 200. The data/command field 208 contains data or a command. The start bit 210 signals the start of the current frame 200.

Known distributed-peripheral arrangements and their communications formats, such as Twinax, are completely satisfactory for many applications. However, competition in the industry spurs engineers to constantly seek improvements to these systems. Communication speed is one design feature that is important to engineers and customers alike. Faster communications between a CPU and its peripheral devices leave more time for the CPU and its peripheral devices to complete their respective jobs. Faster communications also means that the customer does not have to wait as long for data or images to be transferred between the CPU and peripheral device.

Usually, however, the communications port and its attached peripheral devices are built to communicate at one pre-established, fixed rate. One exemplary Twinax protocol, for example, involves communications at one million bits per second (i.e., 1 Mbps). Thus, improvements in communications speed are only possible by upgrading the communications port and the peripheral devices. Cost frequently prevents some users from upgrading components. These users are therefore stuck with the communications rate supported by their ports and other equipment.

Therefore, the desire to increase the communications speeds with minimal upgrading of components has driven engineers to develop new ways of using existing communications equipment, thereby saving costs. One innovative approach, developed by International Business Machines Corp. ("IBM"), involves use of an optimized bit stream ("OBS"). The OBS approach may be implemented in systems using Twinax, for example.

Figure 3:
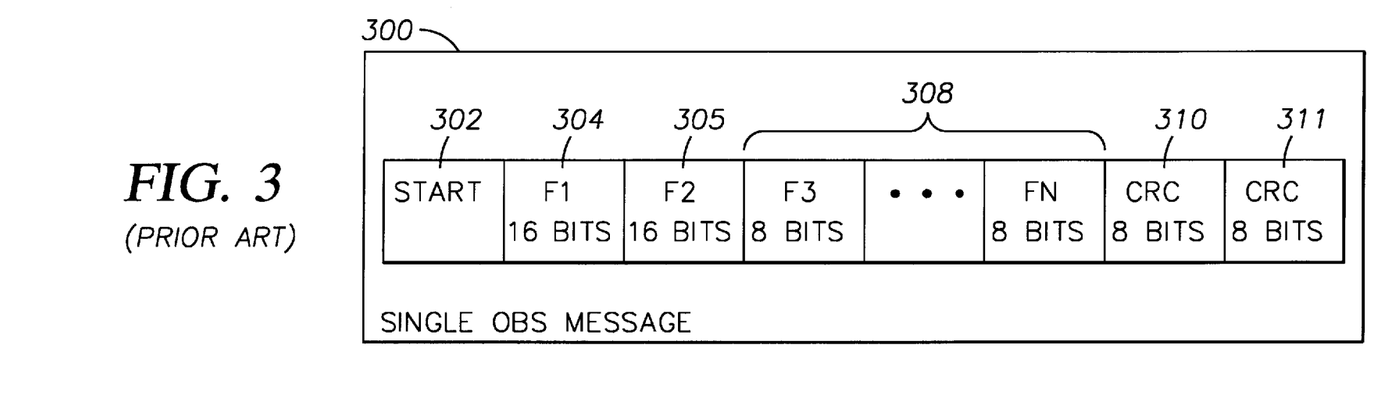
FIG. 3 is a diagram of a conventional OBS message, as known in the art.

FIG. 3 depicts the format of an exemplary OBS message 300. Like the conventional (non-OBS) message 100, the message 300 begins with a start code 302. The start code 302 is followed by two sixteen bit data/command frames 304–305. The remaining data/command frames 308, which represent OBS data, only have eight bits each. As shown below, these eight-bit frames permit the OBS data to be sent in a compressed format. The message 300 ends with two eight-bit cyclical redundancy check ("CRC") frames 310–311 to assure data integrity.

Figure 4:
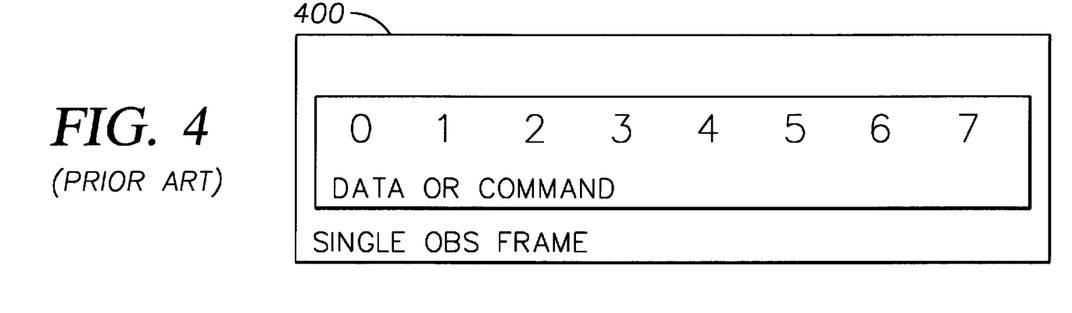
FIG. 4 is a diagram of a conventional OBS frame, as known in the art.

FIG. 4 shows the format of an individual OBS frame 400. The frame 400 simply includes eight command or data bits. Thus, in comparison to the conventional (non-OBS) frame 200, the frame 400 omits the zero fill field 202, parity field 204, station address 206, and start bit 210. As a result of this reduced frame size, the overall OBS message 300 is considerably shorter than the non-OBS message 100 containing the same data and/or commands. Without changing the data transmission rate, the OBS message 300 is therefore transmitted more quickly than the non-OBS message 100.

Figure 5:
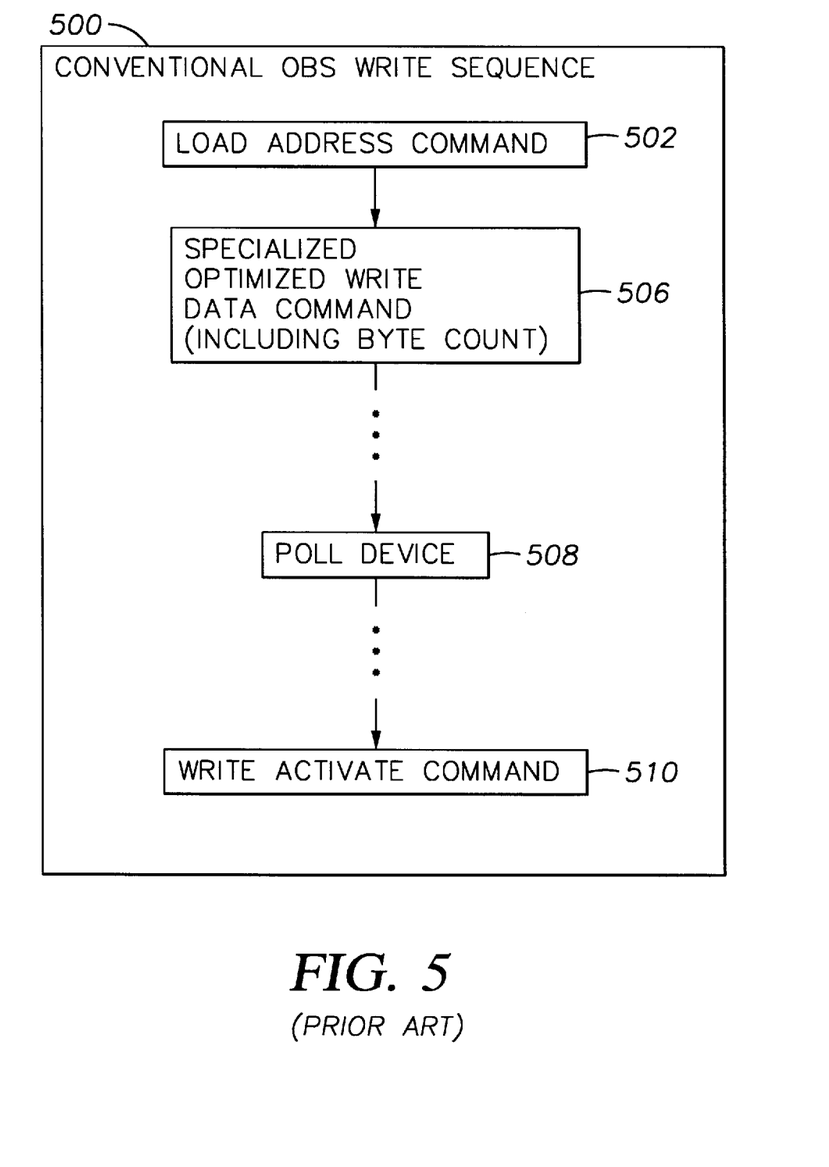
FIG. 5 is a diagram of an exemplary write data message sequence, as known in the art.

FIG. 5 shows a conventional OBS write sequence 500, sent by a controller to initiate writing of data to a peripheral device. This sequence 500 is made up of multiple different subcomponents. More particularly, a first part of the message sequence includes a load address command 502 and a specialized optimized write command 506. The load address command 502 specifies the address in the peripheral device to store the write data. The OBS write command 506 contains a specialized OBS command instructing the peripheral device to prepare to receive OBS data. The command 506 is specialized because it is different than its non-OBS counterpart. The OBS write command 506 also includes a byte count, signifying the number of bytes of write data. The commands 502 and 506 are transmitted together using standard sixteen-bit frames, as shown in FIG. 1.

After issuing the OBS write command 506, the controller polls the peripheral device (task 508) until the peripheral device issues a "ready" message. Then, the controller sends another message containing a "write activate" command 510, which actually commences the write operation, in OBS mode. The write activate command 510 is issued in OBS format, as shown in FIG. 3. Data exchanged as a result of the write activate command 510 also utilizes the OBS format, namely eight-bit frames 308, as shown in FIG. 3. A read operation is similar to a write operation, with data being transferred instead from the peripheral device to the CPU.

The conventional OBS approach completely satisfies the needs of many different applications. One particular advantage is that this approach allows both OBS and non-OBS devices to coexist on the same CPU port. Nonetheless, as mentioned previously, industry competition spurs engineers to constantly improve modern computer systems. Some targeted areas of improvement include features such as the cost, efficiency, design simplicity, and inter-device communication speed of these computer systems, and the ability to maintain existing cable configurations.

SUMMARY OF THE INVENTION

Broadly, the present invention concerns a computer system where properly equipped subcomponents may communicate by exchanging messages having a compressed data format, this format being invoked whenever a "basic" command is modified by an OBS enable code.

The computer system includes a controller and at least one peripheral device coupled to a communications port of the controller. The controller and the peripheral devices are configured to communicate using a predefined "basic" command set employing an uncompressed communications format. The controller also supports a compressed communications format, which is invoked whenever a basic command is accompanied by an OBS enable code.

After verifying that a peripheral device supports the compressed communications format, the controller sends the peripheral device a command from the basic command set accompanied by an OBS enable code. In the case of a write operation, the controller also sends the peripheral device an encoded dataset having the compressed communications format and representing a set of underlying data. Although the basic command alone would signal the transmission of uncompressed data, the presence of the OBS enable code alerts the peripheral device to the transmission of a compressed dataset. After the peripheral device receives the compressed dataset, and because the device has previously received the OBS enable code along with the basic command, the peripheral device processes the dataset and obtains the underlying data.

In one embodiment, then, the invention may be implemented to provide a method to selectively exchange abbreviated messages between a controller and a peripheral device coupled to a communications port of the controller, using basic commands modified by an OBS enable code. In another embodiment, the invention may be implemented to provide an apparatus such as a peripheral device and/or a controller configured to selectively exchange abbreviated messages using basic commands modified by an OBS enable code. In still another embodiment, the invention may be implemented to provide an article of manufacture comprising a data storage device tangibly embodying a program of machine-readable instructions executable by a digital data processing apparatus to perform method steps for communications as described above.

The invention affords its users with a number of distinct advantages. For example, the invention minimizes the necessary command vocabulary of both controllers and peripheral devices. In particular, the exchange of compressed messages is initiated by using a basic command set, modified by the OBS enable code. Thus, separate commands are not required for compressed and uncompressed message transmissions. Thus, programming of the controller and peripheral devices is much simpler and the devices operate more efficiently. This yields a significant savings in product cost. In addition, the streamlined command set makes it easier to write application programs designed for controllers and peripherals using the invention, and also to improve or troubleshoot these systems. The invention provides a number of further benefits, as discussed below.

BRIEF DESCRIPTION OF THE DRAWINGS

The nature, objects, and advantages of the invention will become more apparent to those skilled in the art after considering the following detailed description in connection with the accompanying drawings, in which like reference numerals designate like parts throughout, wherein.

DETAILED DESCRIPTION OF THE PREFERRED EMBODIMENTS

Hardware Components & Interconnections

One aspect of the invention concerns a subcomponent of a computer system, such as a peripheral device or a workstation controller. Along these lines, another aspect of the invention is a computer system including various subcomponents such as peripheral devices and controllers, interconnected to communicate with each other. These and other hardware related aspects of the invention are discussed below.

Overall Computer System

Figure 6:
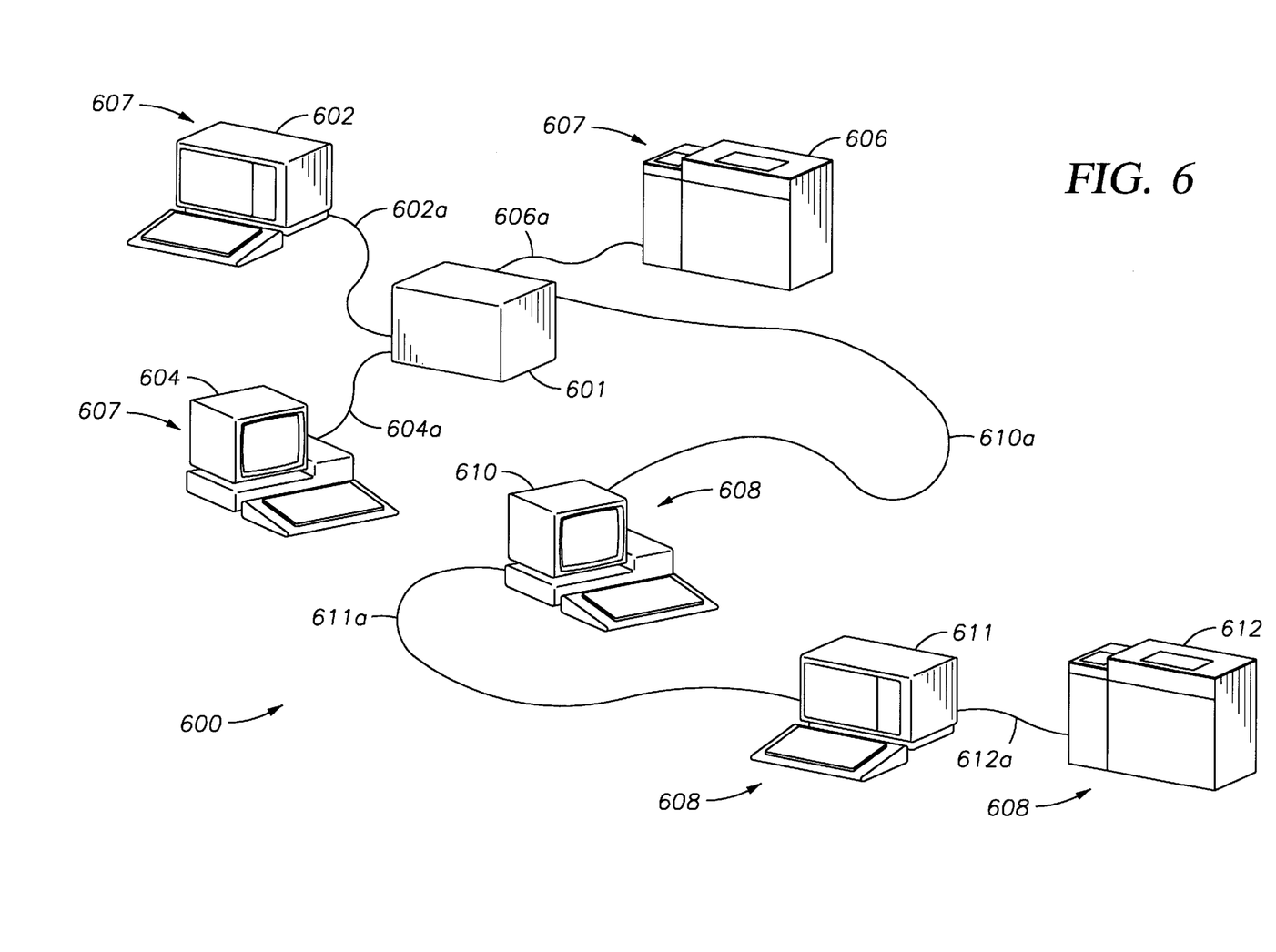
FIG. 6 is a block diagram of the hardware components and interconnections of an illustrative computer system utilizing the present invention.

One aspect of the invention concerns a distributed-peripheral computer system, a specific example of which is shown by the various hardware components and interconnections of the computer system 600 of FIG. 6. The system 600 illustrates the type and arrangement of components suitable for use with the IBM "Twinax" protocol, and may comprise an IBM model 5250 Information Display System.

The system 600 is functionally centered about a workstation controller 601, which is described in greater detail below. The controller 601 is coupled to a number of different peripheral devices, including a number of "point-to-point" peripheral devices 607. These peripheral devices 607 may include a display station 602, printer 606, and a personal computer ("PC") 604 with an appropriate communications card such as a card from the IBM 5250 Express Family of adapters. As described in greater detail below, each of these peripheral devices 607 is separately coupled to a different port (not shown) of the controller 601. These connections are made by cables 602a, 604a, and 606a, which may comprise a suitable type of cable such as IBM Twinaxial cable. As known in the art, Twinaxial cable refers to a shielded twisted pair of wires, where digital signals are transmitted over the wires by applying differential voltages across the wires.

Also coupled to the controller 601 are a number of "cable-thru" peripheral devices 608, which may include a display station 610, a PC 611, and a printer 612. These devices are described in greater detail below. They are coupled in daisy-chain fashion to a single controller port (not shown). Connections are made by cables 610a, 611a, and 612a, which may comprise a suitable type of cable such as IBM Twinaxial cable.

Controller

Preferably, the controller 601 comprises a digital processing machine such as a PC, mid-range computer, mainframe computer, computer workstation, host computer, or other suitable apparatus or part thereof. As a particular example, the controller 601 may comprise an IBM AS/400 model 9401, 9402 9404, or 9406 computer, System/38 model 5381 or 5382 computer, or a System/36 model 5360, 5362, or 5363, or 5364 computer.

Figure 7:
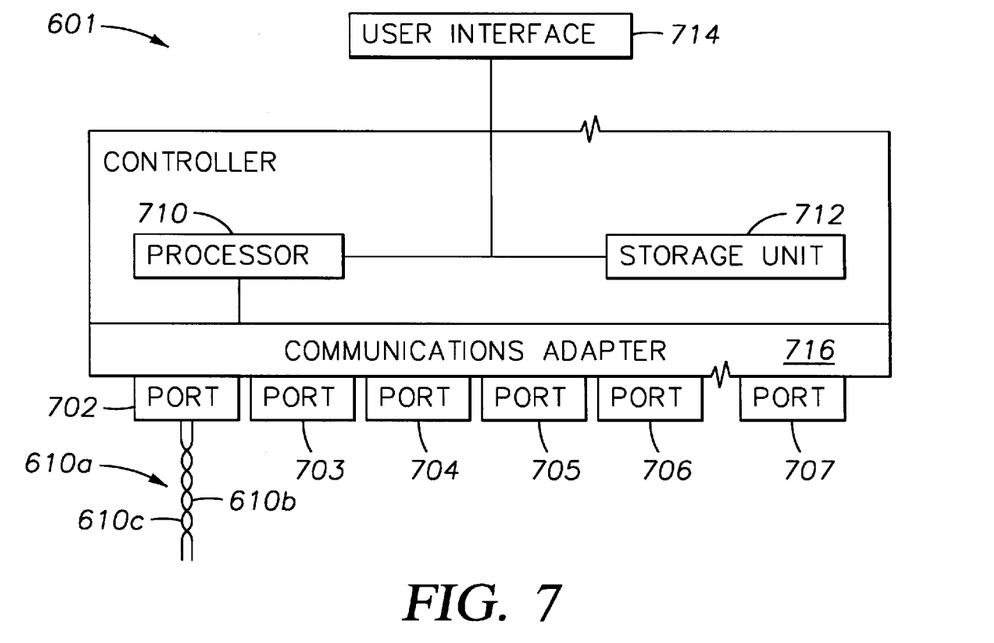
FIG. 7 is a block diagram illustrating a workstation controller of the invention in greater detail.

As shown in FIG. 7, the controller 601 includes a processor 710, a storage unit 712, and a communications adapter 716. The communications adapter 716 provides for serialization and deserialization of data to/from communications ports, which are described below. The controller 601 may be further coupled to a user interface 714, which comprises a computer terminal, keyboard, text display, graphics display, voice recognition unit, or any other suitable means for sending and/or receiving information to a human operator.

The controller 601 includes communications ports 702–707, numbering six in the present example, although another number of ports may be used in actual implementation. Each port is capable of communicating with one device in point-to-point fashion, or with multiple devices in a cable-thru arrangement.

To illustrate an exemplary port in greater detail, reference is made to the port 702. The port 702 may be part of a communications card such as an IBM feature number 2720, 2722, 6180 or another suitable communications port. The port 702 is coupled to the cable 610a, which includes the twisted pair of wires 610b and 610c. Ordinarily skilled artisans, however, may use a different type of port and/or cable without departing from the scope of the present invention.

In the illustrated example, the port 702 is capable of addressing up to seven peripheral devices coupled in a cable-thru arrangement, by transmitting a three bit digital address. Each signal transmitted by the port 702 is received by the peripheral device attached to the port 702, as well as those devices daisy chained to the original peripheral device. However, each device responds only to messages containing a station address 206 corresponding to that specific device. In the present example, the devices respond to address-0, address-1, address-2, address-3, address-4, address-5, or address-6. Address-7 is used to indicate an end of transmission. For ease of understanding, communications between the controller 601, and peripheral devices in this description is limited to point-to-point, i.e., one peripheral device on a port.

Peripheral Device

Figure 8:
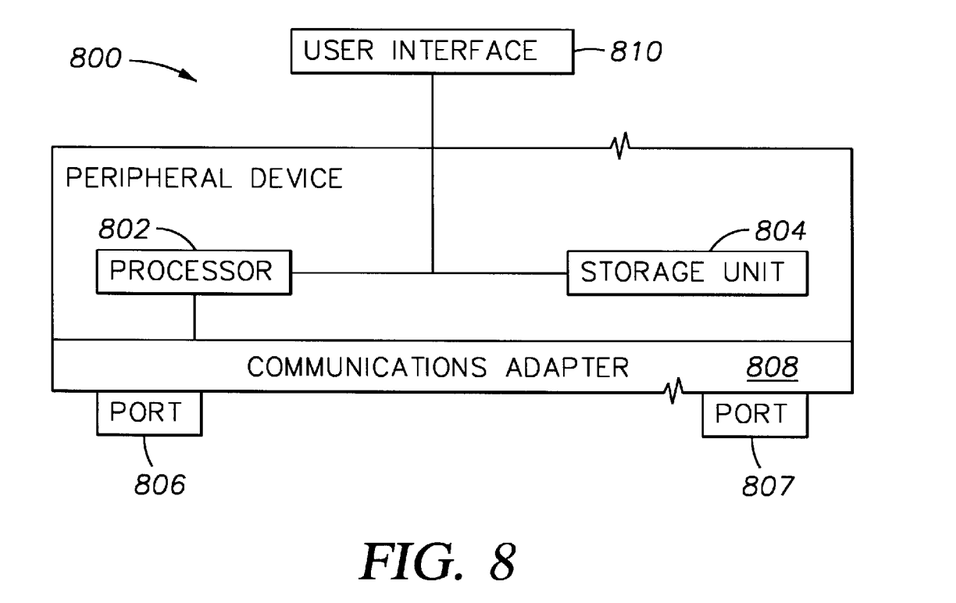
FIG. 8 is a block diagram illustrating a peripheral device of the invention in greater detail.

FIG. 8 illustrates the components of an exemplary peripheral device 800. Each peripheral device 800 generally comprises a digital processing machine, such as a display station, printer, computer workstation, PC, and the like. In one embodiment, the display stations 602/610 may comprise video monitors such as one of IBM display station models 3196, 3486, 3489, 5291, 5251, or another suitable graphics display device. The printers 606/612 may comprise a printer such as one of IBM printer models 5225, 4224, 5256, 5262, 5219, or another suitable printer, plotter, or machine for producing graphics on a tangible output media. Each of the PCs 604/611 may, for example, comprise an IBM PC Aptiva model C21 with a communications card such as one of the IBM Express family of adapters. Each PC 604/611 may also include an IBM model 4019 printer.

As shown in FIG. 8, an exemplary peripheral device 800 includes a processor 802, a storage unit 804, and a communications adapter 808. The device 800 may be further coupled to a user interface 810, which comprises a computer terminal, keyboard, text display, graphics display, voice recognition unit, or any other suitable means for sending and/or receiving information to a human operator.

The peripheral device 800 also includes one or more communications ports 806–807, numbering two in the present example, although another number of ports may be used in actual implementation. Each port 806–807 may be part of a communications card such as a card from the IBM 5250 Express adapter family of cards, or another suitable communications port. Each port communicates with the workstation controller 601 (point-to-point), or with the controller 601 and another peripheral device (cable-thru). The ports may be coupled to Twinax cable, although ordinarily skilled artisans may use a different type of port and/or cable without departing from the scope of the present invention.

As discussed above, the peripheral device 800 receives data (for writing) or provides an output of data (for reading) in response to a unique three bit digital address received from the controller 601. This three bit digital address represents address-0, address-1, etc. Each peripheral device 800 is exclusively associated with a different three bit address, as mentioned above. Thus, each peripheral device 800 monitors its ports 806–807 for incoming messages from the controller 601.

OPERATION

In addition to the various hardware embodiments described above, a different aspect of the invention concerns a method for conducting communications between a peripheral device and a controller in a computer system. Such a method may be implemented, for example, by operating the peripheral device and the controller to execute a sequence of machine-readable programming instructions.

Data Storage Device

These programming instructions may reside in various types of data storage media. In this respect, one aspect of the present invention concerns an article of manufacture, comprising a data storage medium tangibly embodying a program of machine-readable programming instructions executable by a digital data processor to perform method steps for a controller to conduct communications with a peripheral device, or vice versa.

Figure 9:
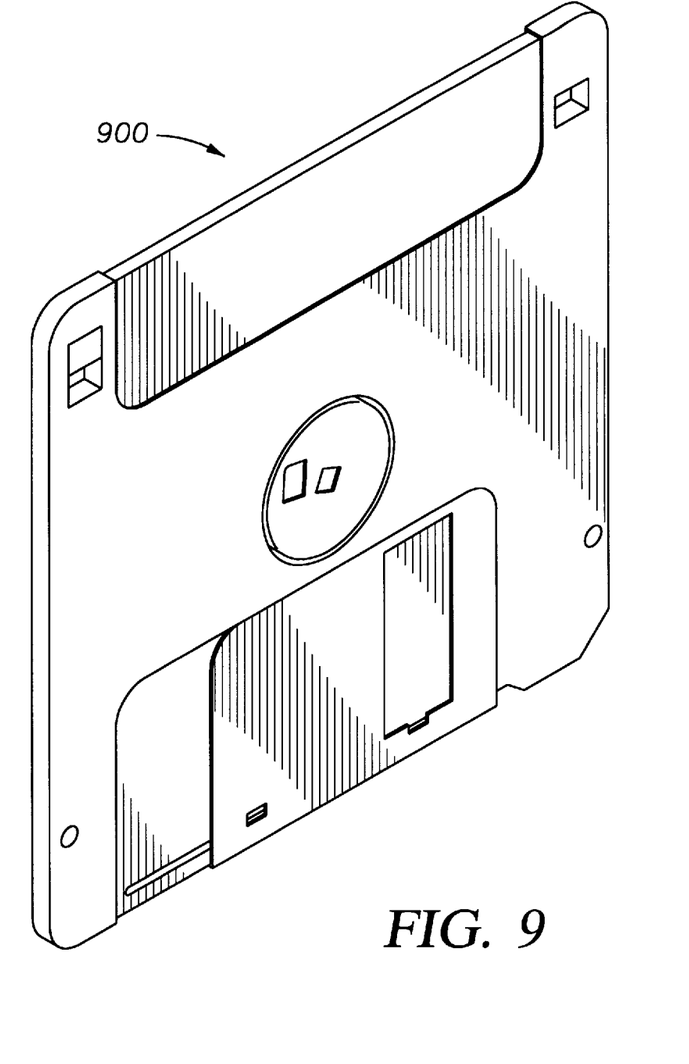
FIG. 9 is a diagram of an article of manufacture, comprising a data storage medium, embodying one aspect of the present invention.

This data storage medium may comprise, for example, RAM contained within the controller or peripheral device. Alternatively, the programming instructions may be contained in another data storage medium, such as a magnetic data storage diskette 900 (FIG. 9). Whether contained in RAM, magnetic data storage diskette, or elsewhere, the machine instructions may instead be stored on another type of data storage medium such as DASD storage (e.g. a conventional "hard drive" or a RAID array), magnetic tape, electronic read-only memory (e.g. ROM), optical storage device (e.g. WORM), paper "punch" cards, or other data storage media. In an illustrative embodiment of the invention, the machine-readable instructions may comprise lines of compiled "C" language code.

Operational Sequence

Figure 10:
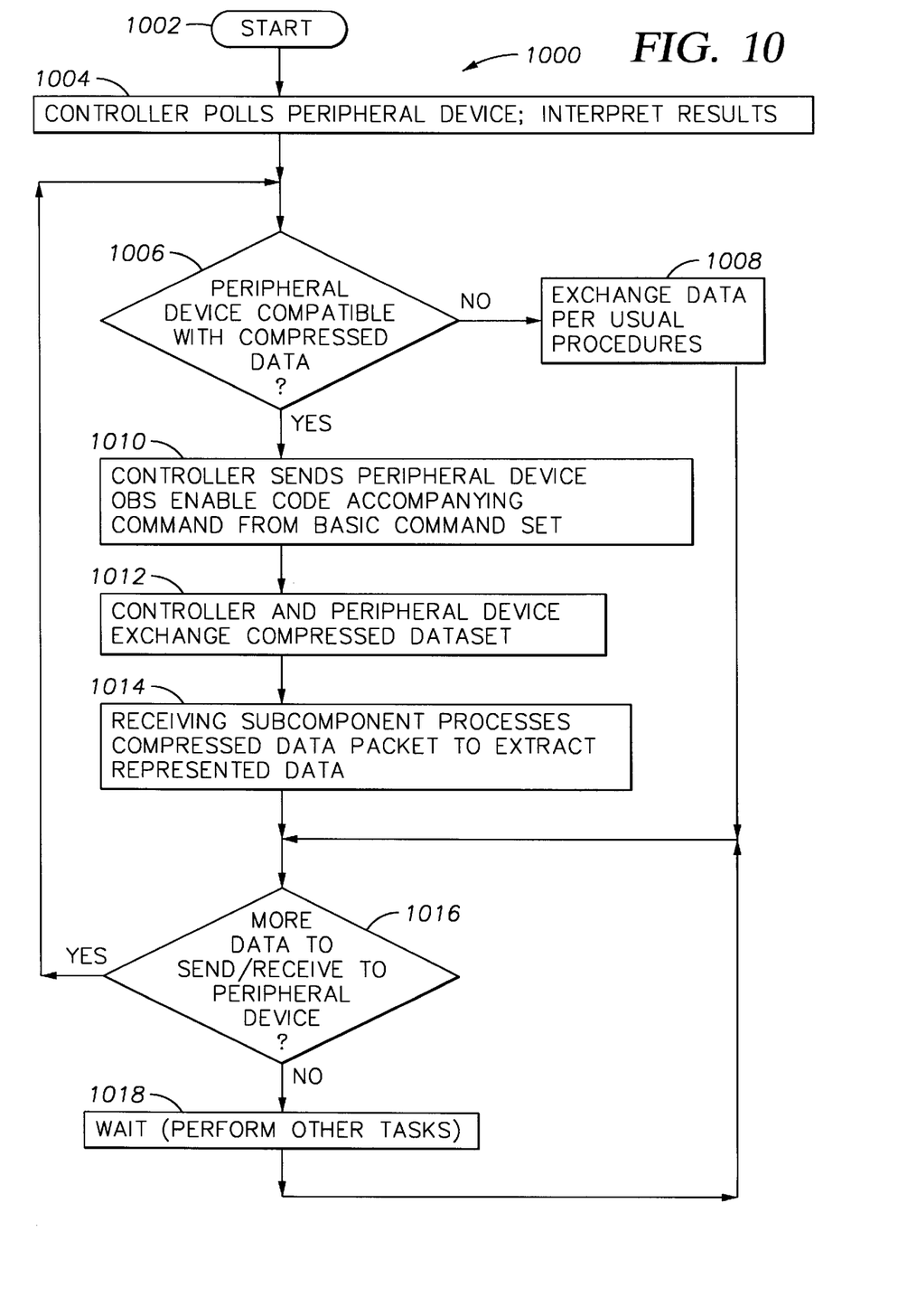
FIG. 10 is a flowchart showing an illustrative sequence of method steps in accordance with the invention.

FIG. 10 shows a sequence of steps 1000 to illustrate one example of the method aspect of the present invention. For ease of explanation, but without any limitation intended thereby, the example of FIG. 10 is described in the context of the computer system 600, controller 601, and peripheral device 800 described above. Although, for clarity of explanation, the sequence 1000 describes communication between the controller 601 and a single peripheral device 800, the invention also contemplates the use of multiple peripheral devices. As mentioned above, the method aspect of the invention enables properly equipped subcomponents of a computer system to communicate by exchanging messages having a compressed data format, this format being invoked by using a basic command modified by an OBS enable code.

The steps are initiated in task 1002, which occur, for example, when the controller 601 first communicates with a particular peripheral device. In the present example, this peripheral device is attached to the port 702 in point-to-point fashion.

Obtaining Device Identifiers

Following task 1002, the controller 601 in task 1004 polls the peripheral device 800 attached to the port 702 to obtain the device's "device identifier". Generally, a device identifier contains various information about the operating characteristics of the corresponding device. As an example, the device identifier of task 1004 may contain data representing the corresponding peripheral device's maximum communications speed, device type, model ID, screen size supported (for graphics interfaces), and other pertinent characteristics. The controller 601 stores this information for future use.

The polling of task 1004 may be achieved, for example, by using a "read status command", which is a known command used in IBM 5250 information display systems. This polling may be performed according to a periodic or other predetermined schedule, for example. As an alternative to polling, the device may submit its own device identifier in response to boot-up, or according to some predetermined schedule.

Determining Weather Perpheral Device Supports OBS

After obtaining the device identifier, the controller 601 utilizes the received device identifier to determine whether the peripheral device 800 is capable of processing messages with OBS format. This capability may be expressed in digital form by the device identifier. As an alternative, the controller 601 may use a lookup table to cross-reference an encoded device identifier to an OBS compatibility listing.

With this information, query 1006 determines whether the peripheral device is OBS compatible. If not, the controller 601 and peripheral device 800 exchange data using a non-optimized bit stream (task 1008), and then proceed to step 1016 described below.

Sending/Processing Message

On the other hand, if query 1006 finds that the peripheral device is OBS compatible, the controller 601 in task 1010 sends one or more commands to the peripheral device 800. These commands are preferably sent in the form of one or more non-OBS messages, culminating in a single OBS message. As explained in greater detail below, the OBS message preferably includes a command from a basic command set accompanied by a corresponding "OBS enable code" for each basic command. In the illustrated embodiment, the OBS enable code comprises a hexadecimal "E9"(or a "09") and a hexadecimal "1A". The structure of the commands sent in task 1010 is described in greater detail below.

Advantageously, the command vocabulary of subcomponents of the computer system 600 need only include "basic commands", i.e., commands that engage the peripheral device in non-OBS transfers. Unlike prior arrangements, no specialized commands, such as a specific "OBS write command", are necessary. Therefore, the command vocabulary of the controller 601 and peripheral devices 800 is not significantly increased, as compared to previous approaches that use a specialized OBS command for each different operation. This is possible because the presence of the enhancement code modifies the basic command; the combination of these elements signals the peripheral device to perform the operation using an OBS format.

Consequently, programming of the controller and peripheral devices is much simpler and the devices operate more efficiently. This yields a significant savings in product cost. In addition, the streamlined command set makes it easier to write application programs designed for controllers and peripherals using the invention, and also to improve or troubleshoot these systems. Also, existing cabling networks can be used without any changes.

After the controller 601 sends the message in task 1010, the controller 601 and the peripheral device 800 carry out the message by exchanging a compressed dataset with OBS formatting (task 1012). This may involve carrying out a write operation (where the controller 601 sends the peripheral device 800 an OBS-compressed data packet), or carrying out a read operation (where the peripheral device 800 sends the controller 601 an OBS-compressed data packet).

Processing Information

After the controller 601 and peripheral device 800 exchange the compressed dataset in task 1012, the receiving subcomponent (i.e., the controller 601 in a read operation, or the peripheral device 800 in a write operation) processes the received dataset, which is compressed, to extract the underlying data. As explained above in FIG. 4, frames of data in an OBS message are free from other fields, such as start bit, zero fill, parity, and station address fields. Thus, to process a received dataset, the receiving device must consider the received byte count to properly receive the dataset.

As the device receives the OBS data, it calculates a running CRC beginning with the first OBS data frame and continuing to the OBS data frame that is third from the end of the OBS message. The last two OBS data frames are then read in. These two OBS data frames contain the CRC value for the OBS message as calculated by the sending device. The receiving device then compares the sending device's CRC with the CRC it calculated. If they match, then the OBS message was received without error. If they do not match during a write operation, a CRC error is sent to the controller 601 from the peripheral device 800 indicating that an error occurred during receipt of the OBS message. If they do not match during a read operation, the controller 601 reissues the read command to the peripheral device 800.

After task 1014, the routine 1000 ends in task 1016.

Additional Data

After an OBS data exchange (tasks 1010–1014) or a non-OBS data exchange (task 1008), the controller 601 in query 1016 asks whether any other data or commands remains to be exchanged between the controller 601 and the peripheral device 800. If so, the routine 1000 returns to query 1006. Otherwise, with no pending operations, the controller 601 enters a wait state 1018, during which the controller 601 may perform other tasks unrelated to exchanging information with peripheral devices. Then, according to a predetermined criteria (such as expiration of a predetermined wait time), the controller 601 returns to query 1016 to check for an pending operations involving the transfer of data and/or commands with the peripheral device 800.

Message Exchange—More Detail

Figure 11:
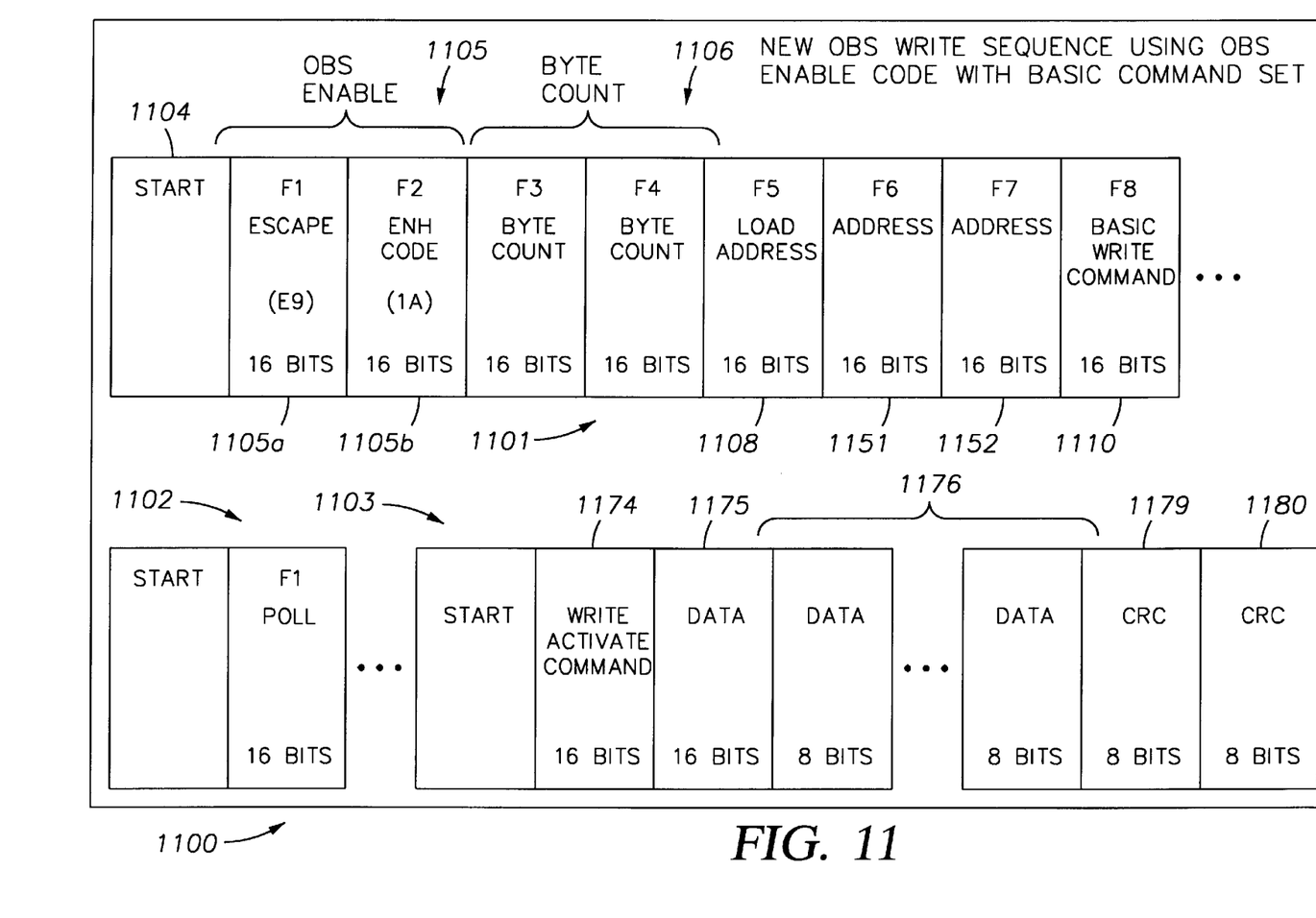
FIG. 11 is a diagram of frames transmitted to implement an OBS message sequence in accordance with the invention.

FIG. 11 details an actual sequence of frames used to implement an exemplary write message sequence. For ease of explanation, but without any limitation intended thereby, the exemplary frame sequence 1100 is described in the context of the computer system 600 described above.

This write message sequence 1100 is made up of multiple different commands and other transmissions. In the present example, three messages 1101–1103 are shown. The first message 1101 begins with a start code 1104, followed by an OBS enable command 1105 (discussed below). In the illustrated example, the OBS enable command 1105 includes an escape command 1105a hexadecimal E9 or hexadecimal 09 and an enhancement code 1105b (hexadecimal 1A). In this case, the escape command 1105a signifies an upcoming OBS command, and the enhancement code 1105b modifies a subsequent read or write data command (in this example, a write data command 1110) by making it an OBS command.

The OBS enable command 1105 is followed by a byte count 1106, which represents the number of bytes of data that accompany the message 1103. In the illustrated example, the byte count 1106 includes first 1106a and second 1106b sixteen-bit frames. After the byte count 1106, a load address command 1108 specifies the address in the desired peripheral device for storage of the write data. The address itself is contained in first 1151 and second 1152 sixteen-bit frames. Then, a basic write command 1110 instructs the peripheral device to write the data that follows the basic write command 1110. The write command 1110 also contains a station address (e.g., 206) to identify the peripheral device intended to receive and store the write data. The basic write command 1110 is taken from a basic command set, a core group of commands that are used in the computer system 600 to exchange non-OBS commands. However, the presence of the OBS enable code 1105 causes the peripheral device to treat the normally non-OBS write command 1110 as an OBS write command. Thus, the OBS enable code 1104 may accompany any basic command. Advantageously, the controller 601 may issue the commands 1104/1105/1106/1108/1151–1152/1110 together, as a single message, with sixteen-bit frames as shown in FIG. 1.

After the sequence 1101, the controller polls the peripheral device 800 using the sequence 1102, and waits until the peripheral device issues a "ready" message (not shown). When the peripheral device is ready, the controller sends another message 1103. The message includes a write activate command 1174, which actually commences the writing of the compressed data in the peripheral device. The first frame 1175 of data exchanged pursuant to the write activate command 1174 occupies sixteen bits; subsequent frames 1176, however, each occupy eight bits. The message 1103 ends with two eight-bit CRC frames 1179–1180. Thus, the message 1103 generally utilizes the format of FIG. 3.

Message Exchange—Read Operation

The subcomponents of a read operation resemble the write operation discussed above. However, instead of the write command 1110, the controller 601 issues a read command (not shown) such as a read data command. And, instead of the write activate command 1174, the controller 601 uses a "read activate command"(not shown) to initiate the reading of compressed data from the peripheral device 800.

OTHER EMBODIMENTS

While there have been shown what are presently considered to be preferred embodiments of the invention, it will be apparent to those skilled in the art that various changes and modifications can be made herein without departing from the scope of the invention as defined by the appended claims.

What is claimed is:

1. A method for conducting communications between a controller and a peripheral device coupled to the controller, the controller and peripheral device each being configured to communicate using a first predetermined command set specifying transmission of commands and data having a predefined first communications format, said method comprising the steps of:

the controller determining that the peripheral device supports a predefined second communications format in addition to the predefined first communications format, the second format omitting predetermined components of the first format;

the controller transmitting to the peripheral device an OBS enable code accompanying a command of the first predetermined command set;

the controller transmitting to the peripheral device an encoded dataset having the predefined second communications format and representing an unencoded dataset; and the peripheral device receiving the encoded dataset and, in response to receipt of the OBS enable code and the accompanying command of the first predetermined command set, processing the encoded dataset to obtain the unencoded dataset.

2. The method of claim 1, the determining step comprising the steps of:

the controller receiving a device identifier from the peripheral device; and the controller interpreting the device identifier to determine whether the peripheral device supports the second communications format.

3. The method of claim 1, the OBS enable code including a hexadecimal 1A code.

4. The method of claim 1, the OBS enable code further including a hexadecimal E9 code.

5. The method of claim 1, the step of the controller transmitting to the peripheral device an OBS enable code accompanying a command of the first predetermined command set comprising the following steps, performed by the controller:

transmitting the OBS enable code to the peripheral device;

transmitting to the peripheral device a byte count indicating a number of bytes in the encoded dataset;

transmitting to the peripheral device a load address command specifying an address for storage of the dataset in the peripheral device; and transmitting to the peripheral device a write command from the first predetermined command set.

6. A method for conducting communications between a controller and a peripheral device coupled to the controller, the controller and peripheral device each being configured to communicate using a first predetermined command set specifying transmission of commands and data having a predefined first communications format, said method comprising the steps of:

the controller determining that the peripheral device supports a predefined second communications format in addition to the predefined first communications format, the second format omitting predetermined components of the first format;

the controller transmitting to the peripheral device an OBS enable code accompanying a command of the first predetermined command set;

in response to receipt of the OBS enable code and the accompanying command of the first predetermined command set, the peripheral device transmitting to the controller an encoded dataset having the predefined second communications format and representing an unencoded dataset; and the controller receiving the encoded dataset and processing the encoded dataset to obtain the unencoded dataset.

7. The method of claim 6, the determining step comprising the steps of:

the controller receiving a device identifier from the peripheral device; and the controller interpreting the device identifier to determine whether the peripheral device supports the second communications format.

8. The method of claim 6, the step of the controller transmitting to the peripheral device an OBS enable code accompanying a command of the first predetermined command set comprising the following steps, performed by the controller:

transmitting the OBS enable code to the peripheral device;

transmitting to the peripheral device a byte count indicating a number of bytes in the dataset;

transmitting to the peripheral device a load address command specifying addresses where the unencoded dataset is stored in the peripheral device; and transmitting to the peripheral device a read command from the first predetermined command set.

9. A peripheral device for use in a computer system, comprising:

a communications port; and a processor, coupled to the communications port, the processor being programmed to communicate with a controller coupled to the port using a first predetermined command set specifying transmission of commands and data having a predefined first communications format, said processor being additionally programmed to perform method steps comprising:

receiving via the port an OBS enable code accompanying a write command of the first predetermined command set;

receiving an encoded dataset from the controller, the encoded dataset having a predefined second communications format omitting predetermined components of the first format, said encoded dataset representing an unencoded dataset; and in response to receipt of the OBS enable code and the accompanying command of the first predetermined command set, recognizing that the dataset is encoded in the second format and processing the dataset to extract the data items.

10. A peripheral device for use in a computer system, comprising:

a communications port; and a processor, coupled to the communications port, the processor being programmed to communicate with a controller coupled to the port using a first predetermined command set specifying transmission of commands and data having a predefined first communications format, said processor being additionally programmed to perform method steps comprising:

receiving via the port an OBS enable code accompanying a read command of the first predetermined command set; and in response to receipt of the OBS enable code and the accompanying command of the first predetermined command set, transmitting via the port an encoded dataset having a predefined second communications format and representing an unencoded dataset, the second format omitting predetermined components of the first format.

11. A computer system controller, comprising:

a communications port; and a processor, coupled to the communications port, the processor being programmed to communicate with a peripheral device coupled to the port using a first predetermined command set specifying transmission of commands and data having a predefined first communications format, said processor being additionally programmed to perform method steps comprising:

transmitting an OBS enable code accompanying a command of the predetermined first command set to the peripheral device; and transmitting an encoded dataset to the peripheral device, the encoded dataset having a predefined second communications format omitting predetermined components of the first format, said encoded dataset representing an unencoded dataset.

12. A computer system controller, comprising:

a communications port; and a processor, coupled to the communications port, the processor being programmed to communicate with a peripheral device coupled to the port using a first predetermined command set specifying transmission of commands and data having a predefined first communications format, said processor being additionally programmed to perform method steps comprising:

transmitting an OBS enable code accompanying a command of the predetermined first command set to the peripheral device;

receiving an encoded dataset from the peripheral device, the encoded dataset having a predefined second communications format omitting predetermined components of the first format, said encoded dataset representing an unencoded dataset; and processing the encoded dataset to extract the unencoded dataset.

13. An article of manufacture comprising a data storage medium tangibly embodying a program of machine-readable instructions executable by a digital processing apparatus of a peripheral device having a port to perform method steps to communicate with a controller coupled to the port, said peripheral device and controller being programmed to communicate using a first predetermined command set where commands and data have a predefined first communications format, said method steps comprising:

a communications port; and a processor, coupled to the communications port, the processor being programmed to communicate with a controller coupled to the port using a first predetermined command set specifying transmission of commands and data having a predefined first communications format, said processor being additionally programmed to perform method steps comprising:

receiving via the port an OBS enable code accompanying a write command of the first predetermined command set;

receiving an encoded dataset from the controller, the encoded dataset having a predefined second communications format omitting predetermined components of the first format, said encoded dataset representing an unencoded dataset; and in response to receipt of the OBS enable code and the accompanying command of the first predetermined command set, recognizing that the dataset is encoded in the second format and processing the dataset to extract the data items.

14. An article of manufacture comprising a data storage medium tangibly embodying a program of machine-readable instructions executable by a digital processing apparatus of a peripheral device having a port to perform method steps to communicate with a controller coupled to the port, said peripheral device and controller being programmed to communicate using a first predetermined command set where commands and data have a predefined first communications format, said method steps comprising:

a communications port; and a processor, coupled to the communications port, the processor being programmed to communicate with a controller coupled to the port using a first predetermined command set specifying transmission of commands and data having a predefined first communications format, said processor being additionally programmed to perform method steps comprising:

receiving via the port an OBS enable code accompanying a read command of the first predetermined command set; and in response to receipt of the OBS enable code and the accompanying command of the first predetermined command set, transmitting via the port an encoded dataset having a predefined second communications format and representing an unencoded dataset, the second format omitting predetermined components of the first format.

15. An article of manufacture comprising a data storage medium tangibly embodying a program of machine-readable instructions executable by a digital processing apparatus of a controller having a port to perform method steps to communicate with a peripheral device, said peripheral device and controller being programmed to communicate using a first predetermined command set where commands and data have a predefined first communications format, said method steps comprising:

a communications port; and a processor, coupled to the communications port, the processor being programmed to communicate with a peripheral device coupled to the port using a first predetermined command set specifying transmission of commands and data having a predefined first communications format, said processor being additionally programmed to perform method steps comprising:

transmitting an OBS enable code accompanying a command of the predetermined first command set to the peripheral device; and transmitting an encoded dataset to the peripheral device, the encoded dataset having a predefined second communications format omitting predetermined components of the first format, said encoded dataset representing an unencoded dataset.

16. An article of manufacture comprising a data storage medium tangibly embodying a program of machine-readable instructions executable by a digital processing apparatus of a controller having a port to perform method steps to communicate with a peripheral device, said peripheral device and controller being programmed to communicate using a first predetermined command set where commands and data have a predefined first communications format, said method steps comprising:

a communications port; and a processor, coupled to the communications port, the processor being programmed to communicate with a peripheral device coupled to the port using a first predetermined command set specifying transmission of commands and data having a predefined first communications format, said processor being additionally programmed to perform method steps comprising:

transmitting an OBS enable code accompanying a command of the predetermined first command set to the peripheral device;

receiving an encoded dataset from the peripheral device, the encoded dataset having a predefined second communications format omitting predetermined components of the first format, said encoded dataset representing an unencoded dataset; and processing the encoded dataset to extract the unencoded dataset.

17. A computer system, comprising:

a controller having a first communications port, the controller being configured to communicate via the first port using a first predetermined command set employing a predefined first communications format; and a peripheral device having a second communications port coupled to the first communications port, the peripheral device being configured to communicate via the second port using the first predetermined command set employing the first communications format;

wherein the controller and peripheral device are programmed to cooperatively perform method steps for communicating with each other, said method comprising the steps of:

the controller determining that the peripheral device supports a predefined second communications format in addition to the predefined first communications format, the second format omitting predetermined components of the first format;

the controller transmitting to the peripheral device an OBS enable code accompanying a command of the first predetermined command set;

the controller transmitting to the peripheral device an encoded dataset having the predefined second communications format and representing an unencoded dataset; and the peripheral device receiving the encoded dataset and, in response to receipt of the OBS enable code and the accompanying command of the first predetermined command set, processing the encoded dataset to obtain the unencoded dataset.

18. The system of claim 17, the determining step comprising the steps of:

the controller receiving a device identifier from the peripheral device; and the controller interpreting the device identifier to determine whether the peripheral device supports the second communications format.

19. The system of claim 17, the step of the controller transmitting to the peripheral device an OBS enable code accompanying a command of the first predetermined command set comprising the steps of:

transmitting the OBS enable code to the peripheral device;

transmitting to the peripheral device a byte count indicating a number of bytes in the encoded dataset;

transmitting to the peripheral device a load address command specifying an address for storage of the dataset in the peripheral device; and transmitting to the peripheral device a write command from the first predetermined command set.

20. A computer system, comprising:

a controller having a first communications port, the controller being configured to communicate via the first port using a basic command set employing a predefined first communications format; and a peripheral device having a second communications port coupled to the first communications port, the peripheral device being configured to communicate via the second port using the basic command set employing the first communications format;

wherein the controller and peripheral device are programmed to cooperatively perform method steps for communicating with each other using a basic command set where commands and data have a predefined first communications format, and method comprising the steps of:

the controller determining that the peripheral device supports a predefined second communications format in addition to the predefined first communications format, the second format omitting predetermined components of the first format;

the controller transmitting to the peripheral device an OBS enable code accompanying a command of the first predetermined command set;

in response to receipt of the OBS enable code and the accompanying command of the first predetermined command set, the peripheral device transmitting to the controller an encoded dataset having the predefined second communications format and representing an unencoded dataset; and the controller receiving the encoded dataset and processing the encoded dataset to obtain the unencoded dataset.

21. The system of claim 20, the determining step comprising the steps of:

the controller receiving a device identifier from the peripheral device; and the controller interpreting the device identifier to determine whether the peripheral device supports the second communications format.

22. The system of claim 20, the step of the controller transmitting to the peripheral device an OBS enable code accompanying a command of the first predetermined command set comprising the steps of:

transmitting the OBS enable code to the peripheral device;

transmitting to the peripheral device a byte count indicating a number of bytes in the dataset;

transmitting to the peripheral device a load address command specifying addresses where the unencoded dataset is stored in the peripheral device; and transmitting to the peripheral device a read command from the first predetermined command set.

* * * * *